United States Patent [19]
Planche

[11] Patent Number: 5,906,458
[45] Date of Patent: May 25, 1999

[54] REAMER WITH CLAMPING ARRANGEMENT FOR ADJUSTABLE CUTTING INSERT

[75] Inventor: Simon Planche, La Tour du Pin, France

[73] Assignee: Seco Tools AB, Fagersta, Sweden

[21] Appl. No.: 08/845,379

[22] Filed: Apr. 25, 1997

[30] Foreign Application Priority Data

Apr. 25, 1996 [SE] Sweden .................................. 9601570

[51] Int. Cl.$^6$ ...................................................... B23B 51/00
[52] U.S. Cl. .............................. 408/197; 407/37; 407/45; 408/181; 408/231; 408/713
[58] Field of Search .................................... 408/186, 197, 408/231, 713; 407/37, 45, 83

[56] References Cited

U.S. PATENT DOCUMENTS

| Re. 34,054 | 9/1992 | Millington et al. ........................ 407/45 |
| 1,779,059 | 10/1930 | Burkart et al. ............................. 407/86 |
| 3,490,315 | 1/1970 | Melchiorre ................................. 77/75 |
| 3,640,637 | 2/1972 | Merz ......................................... 408/72 |
| 5,149,233 | 9/1992 | Kress et al. . |

FOREIGN PATENT DOCUMENTS

| 33 16 053 | 11/1984 | Germany . |
| 440 461 | 8/1985 | Sweden . |

Primary Examiner—Andrea L. Pitts
Assistant Examiner—Monica Smith
Attorney, Agent, or Firm—Burns, Doane, Swecker & Mathis, L.L.P.

[57] ABSTRACT

An adjustable reamer includes a securing portion, a shank, a guide members, at least one cutting insert, an adjustment device for adjusting the insert, and a clamp for clamping the insert. The clamp is releasable from the shank. A first place of contact is created between the clamp and the shank, and a second place of contact is created between the clamp and the cutting insert. An angle between the first and second places of contact in relation to the rotational axis of the reamer is at least 100°, preferably larger than 135°.

13 Claims, 5 Drawing Sheets

FIG. 6
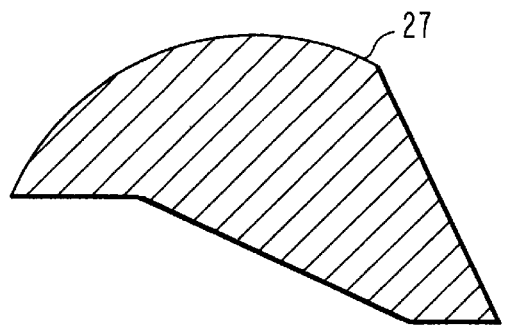
FIG. 7
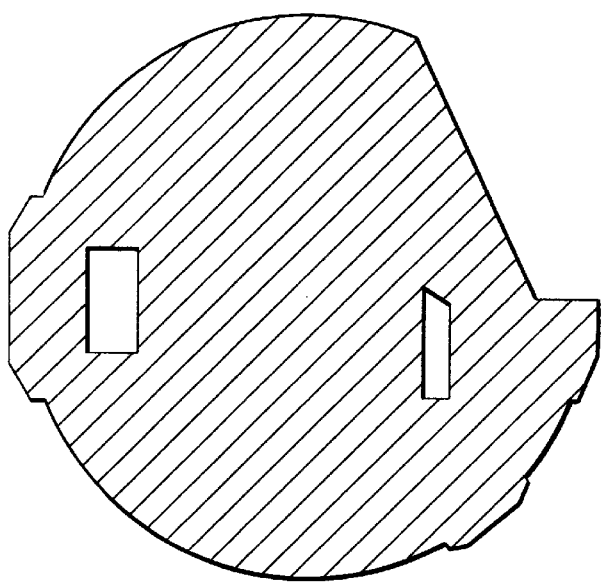
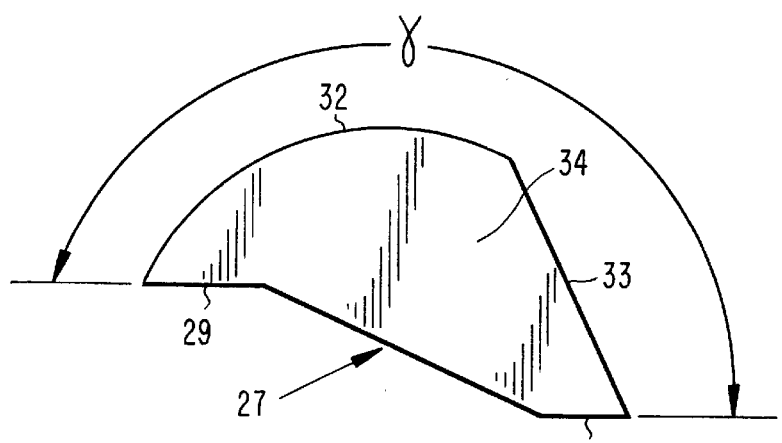
FIG. 8

REAMER WITH CLAMPING ARRANGEMENT FOR ADJUSTABLE CUTTING INSERT

BACKGROUND OF THE INVENTION

The present invention relates to an adjustable reamer, which comprises a securing portion, a shank, guide members, at least one cutting insert and clamping means.

TECHNICAL BACKGROUND

During reaming of small pre-drilled holes of 5 to 10 mm in diameter, conventional solid high speed steel or cemented carbide reamers with helically formed cutting edges are mostly used. The known tools are expensive precision tools, which are used to ream holes to a given diameter. However, once worn, the tool is no longer suitable for performing a reaming operation at that diameter, since a re-grinding of the cutting edges would reduce this effective cutting diameter.

It is further known, for example through Swedish Patent 460,461, Kress et al. U.S. Pat. No. 5,149,233, and German Document No. 33 16 053, to use adjustable reamers for reaming holes of larger diameters (i.e., larger than 10 mm) to obtain hole diameters with fine tolerances.

OBJECTS OF THE INVENTION

One object of the present invention is to provide an adjustable reamer capable of reaming small hole diameters, such as 5 to 10 mm.

Another object of the present invention is to provide an adjustable reamer including a clamping means with three different functions, namely to firmly clamp the cutting insert, to deflect chips as well as to constitute a balancing mass.

Still another object of the present invention is to provide an adjustable reamer which can be adjusted with precision even if the cutting insert has somewhat worn cutting edges such that the reamer can be used during a longer period of time and thus is less expensive than corresponding solid reamers.

SUMMARY OF THE INVENTION

The present invention relates to a reamer which comprises a securing portion and a shank projecting forwardly from the securing portion. The shank defines an axis of rotation that includes a recess and an insert pocket. The recess extends radially inwardly through an envelope surface of the shank. A base of the recess is defined by a first surface which is integral with the shank. The insert pocket is adapted to support a cutting insert. The pocket includes a second surface which is integral with the shank and communicates with the recess. The second surface lies parallel to a first reference plane containing the axis. An adjusting device is mounted to the shank for adjusting an orientation of the insert relative to the axis. A clamp is disposed in the recess and is releasably connected to the shank. The clamp includes an outer surface, at least a portion of which lies flush with an adjacent envelope surface of the shank. The clamp engages the first surface at a first place of contact, and engages the insert at a second place of contact. The first and second places of contact lie on opposite sides of a second reference plane extending perpendicular to the first reference plane and containing the axis. The first place of contact lies closer to the envelope surface than to the axis. A first reference line extends from the axis to the first place of contact and forms an angle with a second reference line that extends from the axis to the second place of contact. That angle is at least 100°. A fastener engages the clamp and causes the clamp to pivot about the first place of contact and pressure the insert at the second place of contact. A pair of guide members is mounted in the envelope surface of the shank in circumferentially spaced apart relationship. Both of the guide members lie outside of the angle as shank is viewed in cross section.

BRIEF DESCRIPTION OF THE DRAWINGS

These and other objects have been achieved with an adjustable reamer according to the present invention such as it is defined in the appended claims with reference to the drawings, wherein:

FIG. 6 shows the cross-sectional areas of a clamp and a tool, respectively, according to the invention;

FIG. 7 shows the cross-sectional areas of a clamp and a tool, respectively, according to the invention; and FIG. 8 is a side elevational view of the clamp.

DETAILED DESCRIPTION OF A PREFERRED EMBODIMENT OF THE INVENTION

Figure 1:
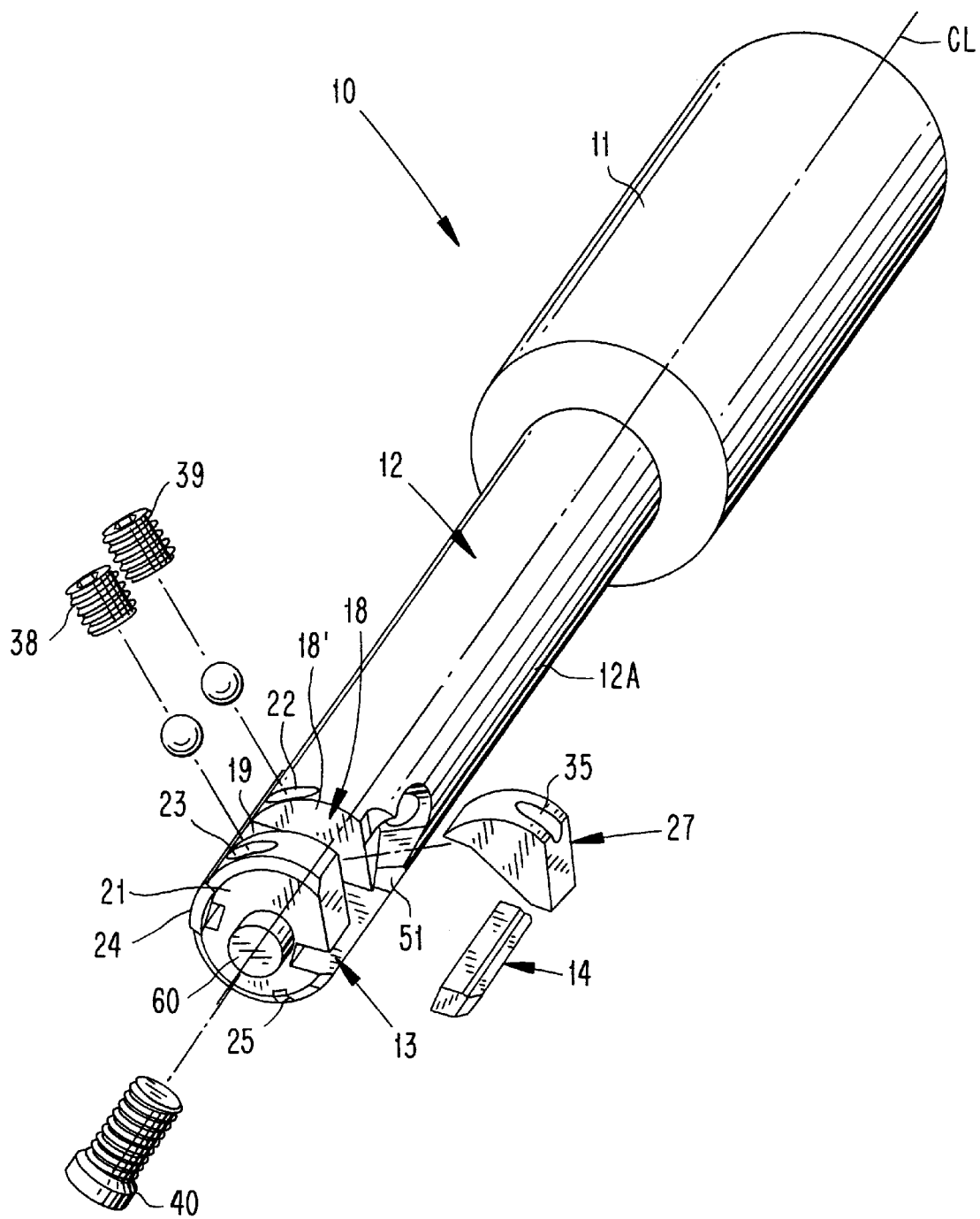
FIG. 1 shows an exploded view in perspective of a reamer according to the present invention.
Figure 2:
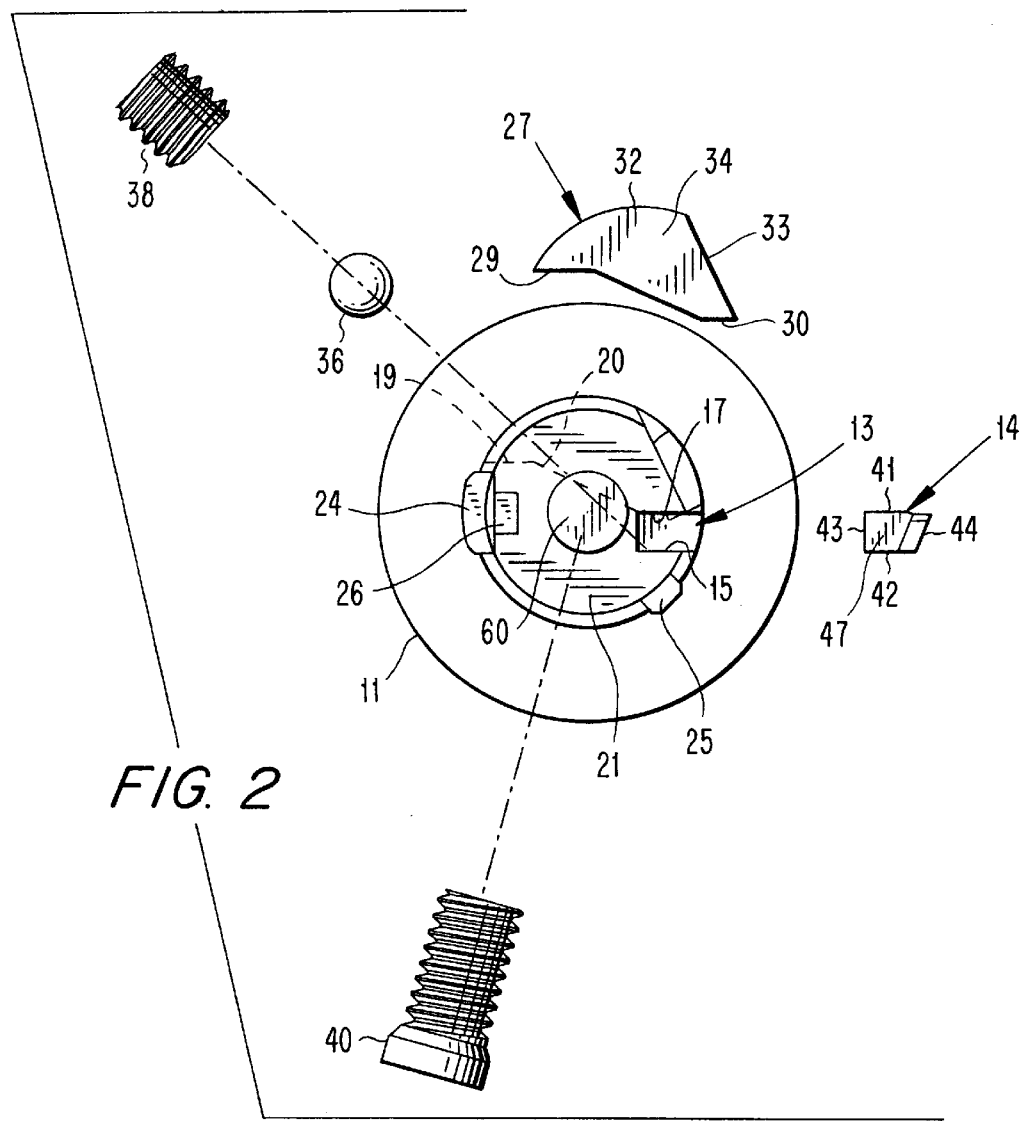
FIG. 2 shows an exploded view of the reamer in an end view.
Figure 4:
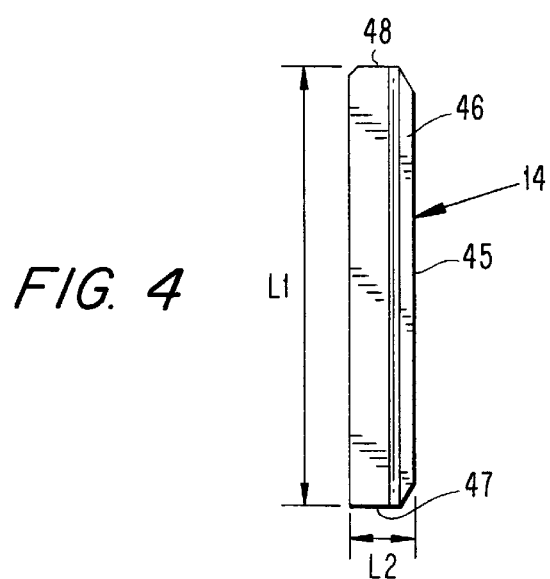
FIG. 4 shows a top view of a cutting insert for the reamer.
Figure 3:
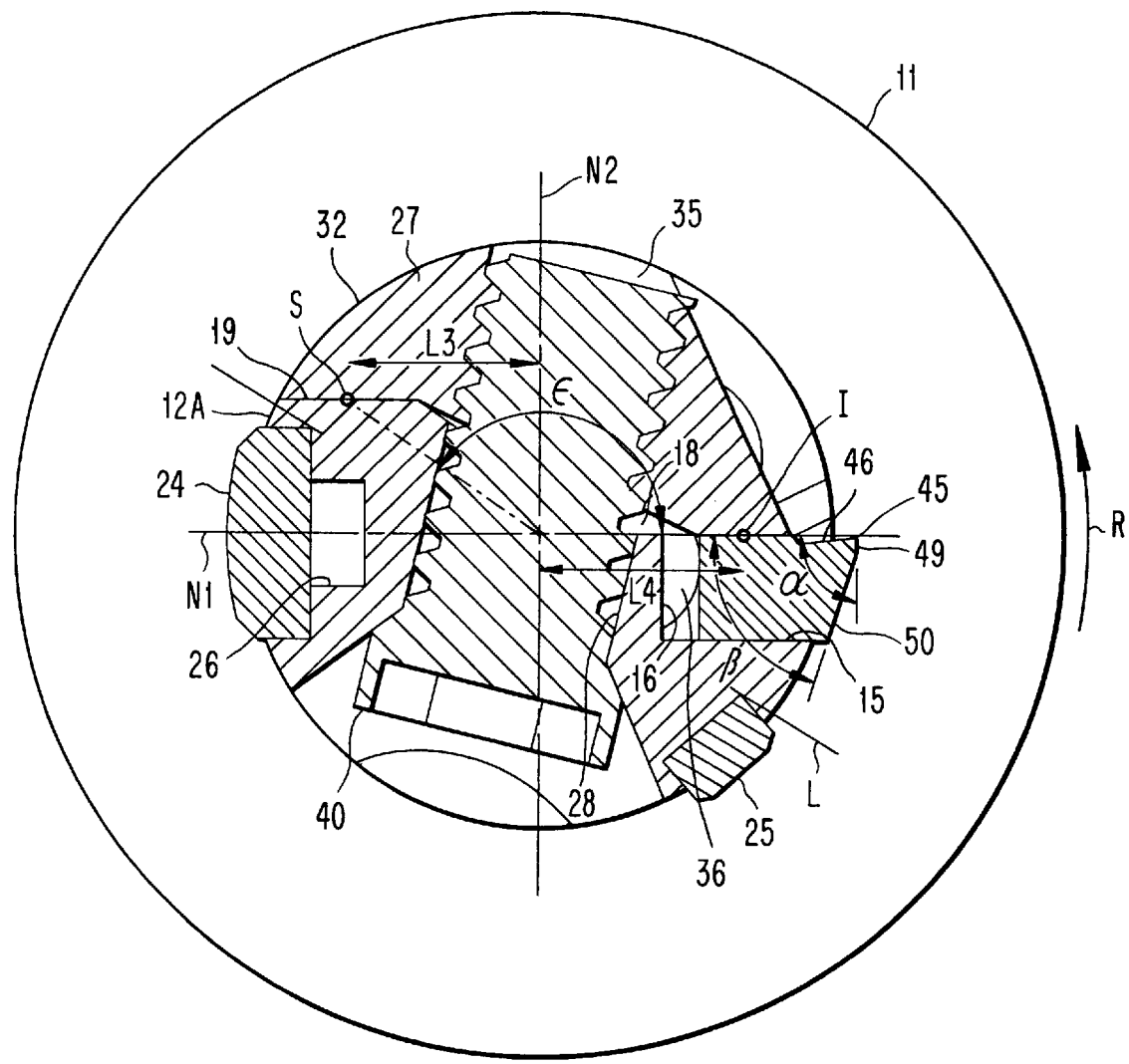
FIG. 3 shows the reamer in a radial cross-section.
Figure 5:
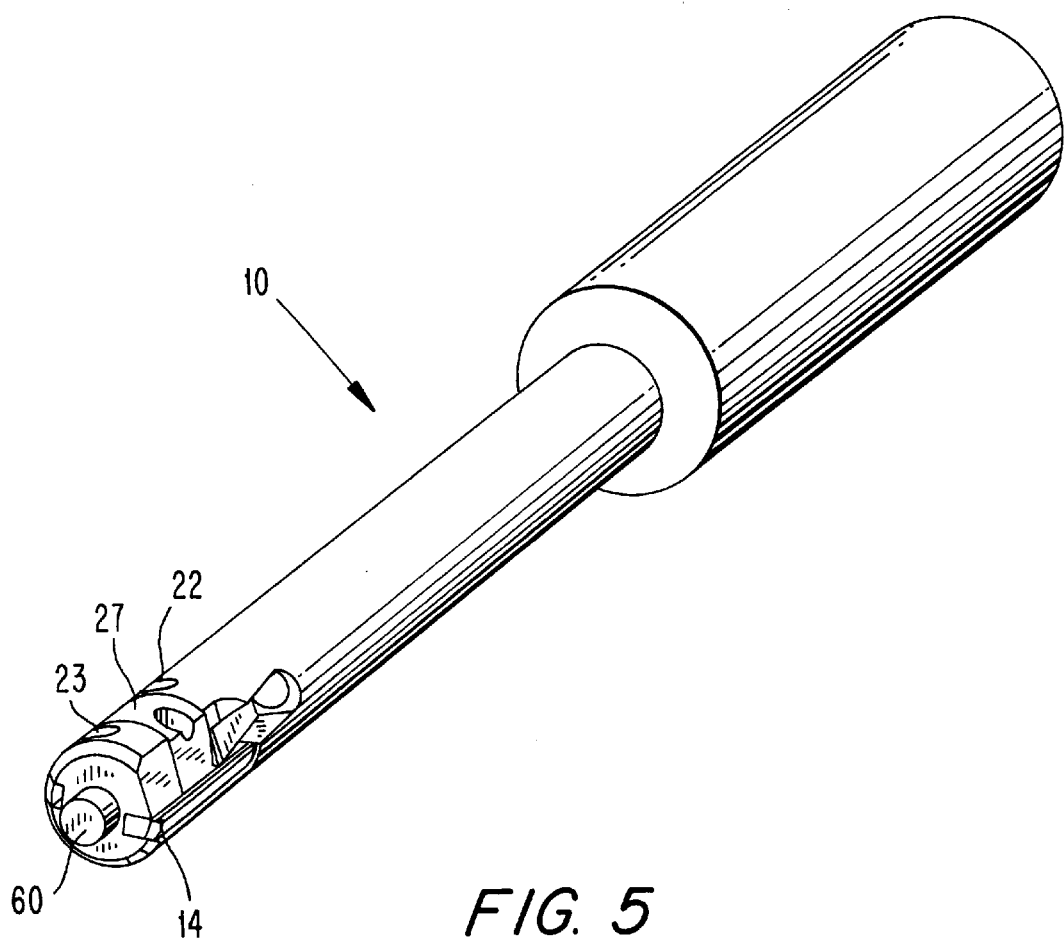
FIG. 5 shows the reamer in a perspective view.

The reamer 10 comprises a securing portion 11, a shank 12 having an envelope surface 12A, a cutting insert 14, a clamp 27, and insert adjustment means 36–39. The securing portion 11 has a substantially cylindrical basic shape and preferably comprises a central flush channel, not shown. The shank 12 is integral with the securing portion 11 and has likewise a cylindrical basic shape, but with a diameter which is less than the biggest diameter of the securing portion. A cutting insert pocket 13 is provided in the vicinity of the free or front end of the shank 12. The insert pocket consists of a support surface 15, a radially outwardly facing inner surface 16, an upper surface 17 and a forwardly facing stop surface 51, and is intended to receive the cutting insert 14, preferably such that the longitudinal direction of the cutting insert becomes substantially parallel with the rotational axis CL of the reamer in mounted condition. A recess 18 (see FIG. 1), which opens up towards the reamer envelope surface, partly runs through the shank near the free end of the shank, and is adapted to receive a clamp 27. The recess 18 comprises a base formed by at least two radially outwardly facing, mutually inclined surfaces, namely a support surface 19 and a free surface 20. The recess also includes two axially facing walls 18', which are essentially perpendicular to the rotational axis CL. The recess 18 is located at an axial distance from an end surface 21 of the reamer. The end surface 21 is provided with an axially projecting stud 60, intended to enter a central dowel hole of a fixture (not shown) for orienting the reamer during adjustment of the cutting insert. The support surface 15 is integral with the shank 12 and is arranged essentially parallel with a first normal or reference plane N1 in which the rotational axis lies. Two, at least partly threaded, holes 22 and 23 are provided at each side of the recess 18. Each of the holes forms an obtuse angle with the normal N1 and terminates in the surfaces 15, 16 and 17, wherein each hole has a diameter which is bigger than the width of the radially inner surface 16. An unthreaded boring 28 (see FIG. 3) runs through the reamer from the envelope surface to the free surface 20. A first guide member 24 of cemented carbide is attached in a groove in the envelope surface of the reamer, substantially diametrically opposite the insert pocket. A second guide member 25 of cemented carbide is attached in a groove in the envelope surface of the reamer essentially under the insert pocket, such as shown in FIG. 3. A flush channel 26 is disposed radially adjacent the first guide member 24, which flush channel 26 suitably is connected to the central flush channel. The first guide member 24 is radially thicker and tangentially wider than the second guide member 25.

The clamping arm or clamp 27 has a shape corresponding generally to that of the recess 18. The clamp has a first abutment surface 29 and a second abutment surface 30 as well as a free surface 31 facing towards the rotational axis of the reamer. The first abutment surface 29 connects to a rounded outer surface 32, having a radius substantially equal to the radius of the shank 12, which rounded surface 32 in its turn connects to a chip forming surface 33. The chip forming surface 33 furthermore connects to the second abutment surface 30. The abutment surfaces 29 and 30 are preferably planar and parallel i.e., those abutment surfaces 29, 30 form therebetween an included angle γ of 180° (see FIG. 8). The clamp furthermore has planar parallel side walls 34 as well as a threaded boring 35, which is intended to be aligned with the boring 28 in the shank. A fastener in the form of a screw 40 secures the clamp to the shank.

The insert adjusting device comprises two balls 36, 37, and two stop screws 38, 39 associated with respective balls. The balls and stop screws are installable in respective holes 22, 23.

The cutting insert 14 has a rectangular basic shape with substantially planar parallel upper and lower sides 41 and 42, respectively, which are interconnected by a rear surface 43 and a clearance surface 44. The rear surface 43 is substantially perpendicular to the sides 41 and 42 while the clearance surface 44 forms an acute angle with the upper side 41 and an obtuse angle with the lower side 42. A cutting edge 45 is formed at the transition between the clearance surface and the upper side, which preferably constitutes an external border line for a chip surface 46. The length L1 of the cutting insert between its end surfaces 47 and 48 is at least seven times the shortest distance L2 between the cutting edge 45 and the rear surface 43. Furthermore the clearance surface 44 consists of a first part 49 (see FIG. 3), which forms an acute angle α with the upper side, as well as a second part 50, which forms an acute angle β with the upper side. The angle α is from about 81 to 85° and the angle β is from about 65 to 75°. The choice of angles is important to retain a strong cutting edge in combination with a sufficient clearance for the cutting insert from the drilled hole.

Assembly of the reamer is done as follows. The balls 36, 37 are inserted in the holes 22 and 23, respectively, and the reamer is held so that gravity on the balls forces them downwards to an end position in the associated hole. Each ball is stopped at the end position defined by the ends of respective holes 22, 23. The stop screws 38, 39 are inserted but not tightened. Then the abutment surface 29 of the clamp is put against the support surface 19 of the recess, so that the threaded boring 35 is aligned with the boring 28 in the recess. The screw 40 is inserted in the boring 28 and is screwed into in the boring 35 of the clamp. The clamp will pivot about the place of contact S (see FIG. 3) in the vicinity of the envelope surface 12A of the reamer. By the term "in the vicinity" is here meant that the distance between the place of contact S and the closest part of the envelope surface is, at maximum, 20% of the working diameter of the reamer, preferably less than 10%. The maximum moment lever is achieved if the place S is at the envelope surface. The cutting insert 14 is then inserted against the integrated support surface 15 and the stop surface 51, thereby defining the axial position of the cutting insert, and abutting against the balls 36, 37, displacing the balls away from their end positions. The cutting insert is retained by hand power while the screw 40 is tightened until the cutting insert is somewhat clamped by the clamp. With the reamer disposed in a fixture to define the proper orientation of the cutting edge, the stop screws are tightened such that they come to influence the balls, which in turn bear against the rear surface 43 of the insert, thereby holding the cutting edge of the cutting insert at a suitable angle relative to the rotational axis CL. The screw 40 is then tightened firmly such that the surfaces 29 and 30 of the clamp abut against the support surface 19 of the shank and against the upper side 41 of the cutting insert, respectively. It is important that a gap exists between the surfaces 20 and 31, such that a first place of contact I arises between clamp and cutting insert. A second place of contact S between clamp and shank is arranged substantially diametrically opposite the cutting insert 14 to obtain a great momentum on the clamp upon tightening the screw 40. The first and second places of contact S,I are separate and are provided at substantially the same distance L3 and L4, respectively, from a second normal or reference plane N2 containing the rotational axis CL, and extending perpendicular to the first normal N1. The distance L3 or L4 is shorter than the cutting insert length L2. According to a preferred embodiment of a reamer according to the present invention the angle ε, between a first reference line intersecting the place of contact S and the axis CL and a second reference line intersecting the place of contact I and the axis CL of the reamer such as shown in FIG. 3, is at least 100°, preferably bigger than 135°. By the expression "place of contact" is here meant points, lines or surfaces. In case surfaces are intended, the angle ε is calculated from the middle of such surface of contact.

The external portion 32 of the clamp 27 will substantially coincide with the external cylindrical shape of the shank when the reamer is ready to be used.

A reference plane (not shown) extending perpendicular to the axis CL at a location passing through the clamp but axially spaced from the bores 28 and 35, will define a cross-sectional area of the shank (shown in FIG. 7), a part of which is formed by the area of the clamp (depicted in FIG. 6).

For purposes of this invention, the cross-sectional area of the shank shown in FIG. 7 includes the clamp, the guides 24 and 25, and the insert 14.

The cross-sectional area of the clamp 27 (FIG. 6) constitutes about 30 to 40% of the cross-sectional area of the shank (FIG. 7), which means that the clamp has a high weight relative to the rest of the shank, and therefore the clamp constitutes a balancing mass which minimizes tolerance faults, especially at high rotational speeds.

The places of contact S and I are located on opposite sides of the plane N2, and are located substantially on a common side which is opposite both guide members 24, 25, i.e., the guide members 24, 25 are separated from the places of contact S,I by an imaginary line L shown in FIG. 3. That is, the guide members 24 and 25 lie outside of the angle ε as can be seen in the cross section of FIG. 3. Preferably the place of contact S trails the first guide member 24 with reference to the rotational direction R.

The adjustable reamer according to the present invention can be used to ream small hole diameters, for example 5 to 10 mm, preferably about 6 mm, wherein the clamp 27 has three different functions, namely to firmly clamp the cutting insert, to deflect chips as well as to constitute a balancing mass.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A reamer comprising:

a securing portion;

a shank projecting forwardly from the securing portion and defining an axis of rotation, the shank including:

a recess extending radially inwardly through an envelope surface of the shank, a base of the recess defined by a first support surface integral with the shank, and an insert pocket adapted to support a cutting insert, the pocket including a second support surface integral with the shank and communicating with the recess, the second support surface lying parallel to a first reference plane containing the axis;

an insert supported on the second support surface;

an adjusting device mounted to the shank for adjusting an orientation of the insert relative to the axis;

a clamp disposed in the recess and releasably connected to the shank, the clamp including an outer surface at least a portion of which lies flush with the adjacent envelope surface of the shank, the clamp including a first abutment surface engaging the first support surface at a first place of contact, and the clamp including a second abutment surface engaging the insert at a second place of contact, the first and second places of contact lying on opposite sides of a second reference plane extending perpendicular to the first reference plane and containing the axis, the first place of contact extending substantially to the envelope surface and lying closer to the envelope surface than to the axis, the first and second abutment surfaces forming therebetween a first angle which is not less than substantially 180 degrees;

a first reference line extending from the axis to the first place of contact forming a second angle with a second reference line extending from the axis to the second place of contact, the second angle being at least 100°;

a fastener engaging the clamp and causing the first abutment surface to be pressed against the first support surface, and the second abutment surface to be pressed against the insert; and a pair of guide members mounted in the envelope surface of the shank in circumferentially spaced apart relationship, both of the guide members lying outside of the second angle as the shank is viewed in cross section.

2. The reamer according to claim 1 wherein the second angle is at least 135°.

3. The reamer according to claim 1 wherein the clamp has a first bore formed therein, and the shank has a second bore formed therein in alignment with the first bore, the fastener extending through the first and second bores.

4. The reamer according to claim 3 wherein one of the first and second bores has an internal screw thread, and the fastener comprises a screw threadedly connected to the screw thread.

5. The reamer according to claim 3 wherein a cross-sectional area of the tool is defined by a plane passing through the shank perpendicular to the axis and spaced axially from the first and second bores, whereby the cross-sectional area includes the clamp, the shank, the guide members, and the cutting insert, the clamp forming about 30 to 40% of that cross-sectional area.

6. The reamer according to claim 1 wherein a distance from the second reference plane to the first place of contact is substantially equal to a distance from the second reference plane to the second place of contact.

7. The reamer according to claim 1 wherein the clamp includes a surface disposed between the first and second places of contact and which is spaced from the shank to form a radial gap therebetween.

8. The reamer according to claim 1 wherein the shank includes at least one hole communicating with the insert seat, the adjusting device comprising a ball movably disposed in the respective hole and contacting the insert, and a stop screw threadedly mounted in the respective hole for displacing the ball.

9. The reamer according to claim 1 wherein the first and second abutment surfaces are parallel to one another.

10. The reamer according to claim 1 wherein the envelope surface of the shank is cylindrical.

11. The reamer according to claim 10 wherein the outer surface of the clamp is cylindrical and forms a continuation of the cylindrical envelope surface of the shank.

12. The reamer according to claim 1 wherein the recess includes a pair of axially spaced walls formed by the shank and arranged to guide the insertion of the insert into the recess.

13. The reamer according to claim 1 wherein the insert includes a surface extending parallel to the axis and engaged by the second abutment surface of the clamp, the second abutment surface engaging only a portion of the insert surface of the insert, that portion disposed between axially spaced ends of the insert surface.

* * * * *